United States Patent
Chang et al.

(10) Patent No.: US 7,821,652 B2
(45) Date of Patent: Oct. 26, 2010

(54) SYSTEM AND METHOD FOR FOCUSING DISCRETE POINTS ON AN UNDER-MEASURED OBJECT

(75) Inventors: Chih-Kuang Chang, Taipei Hsien (TW); Li Jiang, Shenzhen (CN)

(73) Assignees: Hong Fu Jin Precision Industry (ShenZhen) Co., Ltd., Shenzhen, Guangdong Province (CH); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 521 days.

(21) Appl. No.: 11/967,111

(22) Filed: Dec. 29, 2007

(65) Prior Publication Data
US 2009/0076771 A1   Mar. 19, 2009

(30) Foreign Application Priority Data
Sep. 14, 2007   (CN) ........................ 2007 1 0201698

(51) Int. Cl.
  *G01B 11/14*   (2006.01)
  *G02B 7/04*    (2006.01)
(52) U.S. Cl. ........................ 356/624; 356/625; 356/634; 250/201.2; 250/201.5
(58) Field of Classification Search ................ 356/624, 356/634, 614, 620, 625; 250/201.2, 201.5
See application file for complete search history.

(56) References Cited

U.S. PATENT DOCUMENTS

| 4,532,420 | A | 7/1985 | Nakajima | |
| 6,483,091 | B1 * | 11/2002 | Sadler et al. | 250/201.2 |
| 2009/0015833 | A1 * | 1/2009 | Heiden et al. | 356/364 |
| 2009/0206234 | A1 * | 8/2009 | Okuda et al. | 250/201.2 |

* cited by examiner

*Primary Examiner*—L. G Lauchman
(74) *Attorney, Agent, or Firm*—Frank R. Niranjan

(57) ABSTRACT

A method for focusing discrete points on an under-measured object is provided. The method includes: (a) receiving an image of the object, selecting measurement points on the image, and obtaining X, Y coordinate values of the measurement points; (b) searching a solid point on the under-measured object according to the X, Y coordinate value of one of the measurement points, wherein the solid point corresponds to the measuring point; (c) emitting a laser light to the solid point for computing a vertical distance "h" between the laser aid and the solid point; (d) computing a Z coordinate value of the measurement point according to the "h"; repeating step (b) to step (d) until all the Z coordinate values of the measurement points have been computed; and (e) focusing the solid points according to the X, Y and Z coordinate values of the measurement points. A related system is also provided.

8 Claims, 3 Drawing Sheets

SYSTEM AND METHOD FOR FOCUSING DISCRETE POINTS ON AN UNDER-MEASURED OBJECT

BACKGROUND OF THE INVENTION

1. Field of the Invention

The present invention generally relates to an image measuring method, particularly to a system and method for focusing discrete points on an object using the image measuring method.

2. Description of Related Art

Nowadays, the method of image measuring is widely used in precision measurement field. Measuring objects by using the method of image measuring is very accurate and fast.

Conventionally, when measuring the objects using the method of image measuring, a lens is used for focusing the objects, and a charge coupled device (CCD) is used for capturing the images of the objects focused by the lens. The images captured by the CCDs are then transmitted to an image acquired card of a computer, and a measuring program installed in the computer measures the images automatically.

However, in the existing image measuring method, if users want to measure one point or more discrete points on the object, using the lens to focus the points on the object, time is waste and accuracy is very low. Furthermore, the focus accuracy is influenced by light circumstance.

SUMMARY OF THE INVENTION

A preferred embodiment provides a system for focusing discrete points on an under-measured object. The system includes a computer and a measuring machine. The measuring machine is installed with a lens, a CCD, and a laser aid. The measuring machine is configured for obtaining an image of the under-measured object. The computer includes: an image acquiring card and a focusing program. The image acquiring card is connected to the CCD through a cable, and is configured for acquiring the image of the under-measured object from the CCD. The focusing program includes: a selecting module configured for selecting one or more measurement points on the image, and obtaining X-coordinate values and Y-coordinate values of the measurement points; a controlling module configured for controlling the laser aid to search solid points on the under-measured object by moving the measuring machine according to the X-coordinate values and the Y-coordinate values of the measurement points, to emit laser lights to the solid points, and to compute a vertical distance "h" between the laser aid and each of the solid points according to the laser light reflected from each solid point, wherein each solid point on the under-measured object corresponds to a specific measurement point on the image; a computing module configured for computing a Z-coordinate value of each of the measurement points according to the vertical distance "h"; and a focusing module configured for controlling the lens to focus the solid points one by one on the under-measured object by moving the measuring machine according to the X-coordinate value, the Y-coordinate value, and the Z-coordinate value of each measurement point.

Another preferred embodiment provides a method for focusing discrete points on an under-measured object. The method includes steps of: (a) receiving an image of the under-measured object from a measuring machine, selecting one or more measurement points on the image, and obtaining X-coordinate values and Y-coordinate values of the measurement points; (b) controlling a laser aid installed on the measuring machine to search a solid point on the under-measured object by moving the measuring machine according to the X-coordinate value and the Y-coordinate value of one of the measurement points, wherein the solid point corresponds to the measuring point; (c) controlling the laser aid to emit a laser light to the solid point, and to compute a vertical distance "h" between the laser aid and the solid point according to the laser light reflected from the solid point; (d) computing a Z-coordinate value of the measurement point according to the vertical distance "h"; repeating step (b) to step (d) until all the Z-coordinate values of the measurement points have been computed; and (e) focusing the solid points one by one through a lens installed on the measuring machine by moving the measuring machine according to the X-coordinate value, the Y-coordinate value, and the Z-coordinate value of the measurement point.

Other advantages and novel features of the present invention will become more apparent from the following detailed description of preferred embodiment when taken in conjunction with the accompanying drawings, in which:

DETAILED DESCRIPTION OF THE INVENTION

Figure 1:
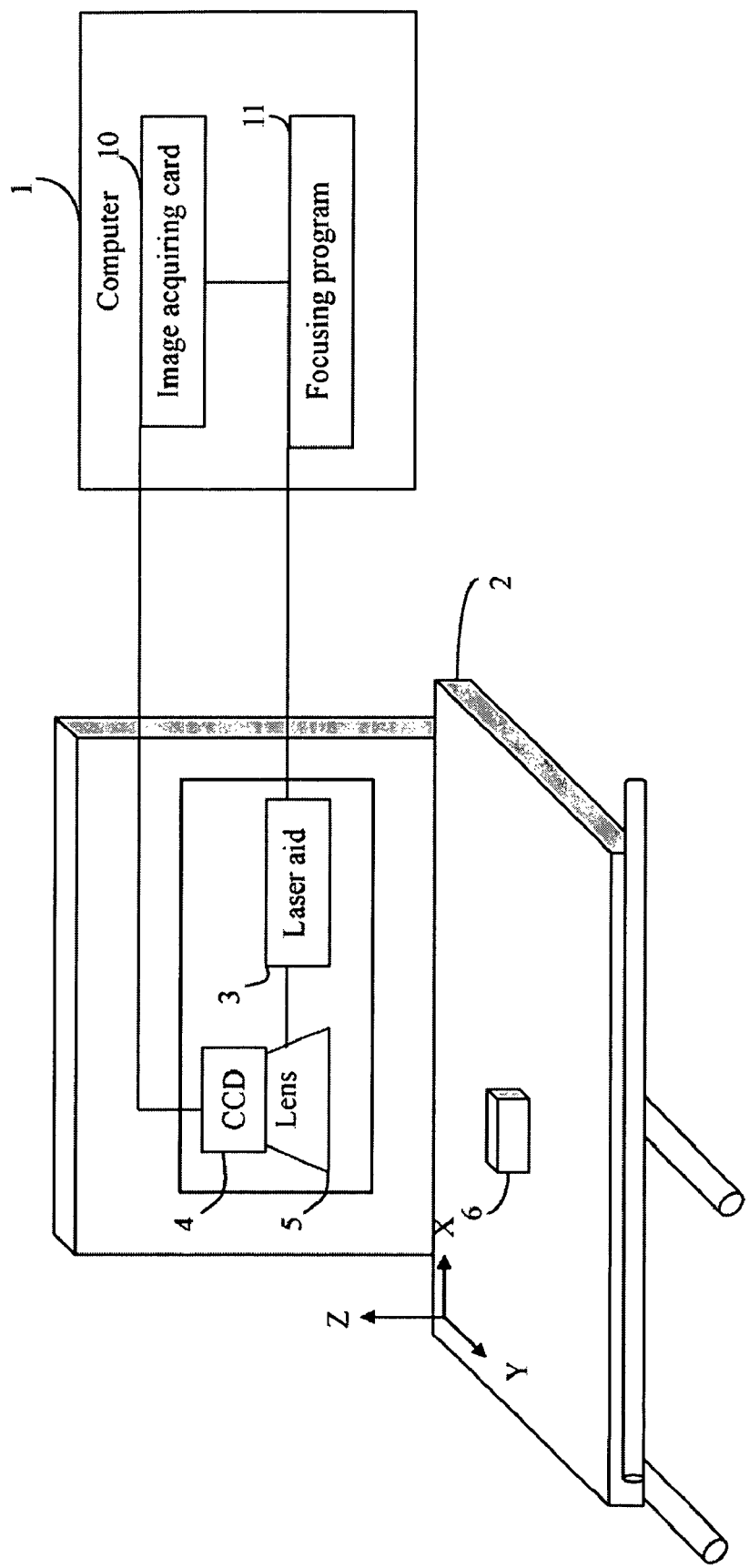
FIG. 1 is a schematic diagram of hardware configuration of a system for focusing discrete points on an under-measured object in accordance with a preferred embodiment.

FIG. 1 is a schematic diagram of hardware configuration of a system for focusing discrete points on an under-measured object (hereinafter "the system"), in accordance with a preferred embodiment. The system typically includes a computer 1, and a measuring machine 2 on which an under-measured object 6 is placed. A CCD 4 and a lens 5 are installed on a movable Z-axle of the measuring machine 2. The CCD 4 is used for capturing an image of the under-measured object 6 through the lens 5.

Furthermore, a laser aid 3 is also installed on the movable Z-axle of the measuring machine 2, and is used for scanning the under-measured object 6 for searching solid points on the under-measured object 6 by moving the movable Z-axle of the measuring machine 2, emitting laser lights to the solid points, and computing a vertical distance "h" between the laser aid 3 and each of the solid points according to the laser light reflected from each solid point, wherein the solid points on the under-measurement object 6 correspond to measuring points selected on the image of the under-measured object 6.

The computer 1 typically includes an image acquiring card 10 and a focusing program 11. The image acquiring card 10 is connected to the CCD 4 through a cable, and is configured for acquiring the image of the under-measured object 6 from the CCD 4. The image can be shown on a display of the computer 1 when focusing the points on the under-measured object 6.

The focusing program 11 includes a plurality of software function modules which are mainly configured for selecting the measurement points on the image of the under-measuring object 6, and focusing the solid points corresponding to the measuring points on the under-measured object 6.

Figure 2:
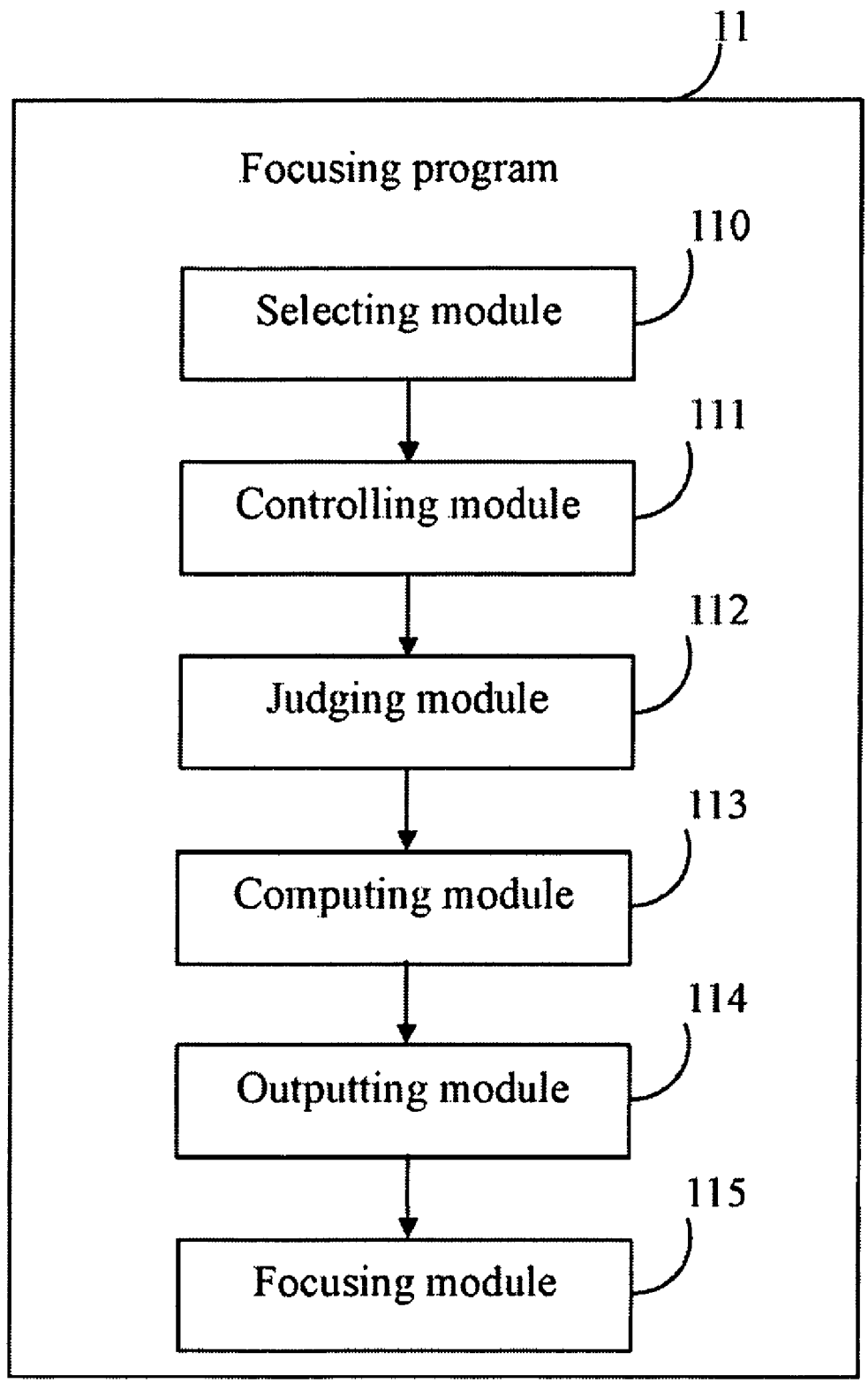
FIG. 2 is a block diagram of function modules of a focusing program in FIG. 1.

FIG. 2 is a block diagram of function modules of the focusing program 11 in FIG. 1. The focusing program 11 mainly includes: a selecting module 110, a controlling module 111, a judging module 112, a computing module 113, an outputting module 114, and a focusing module 115.

The selecting module 110 is mainly configured for receiving the image of the under-measured object 6 acquired by the image acquiring card 10, selecting the measurement points on the image, obtaining X-coordinate values and Y-coordinate values of the measurement points. The measurement points may be a single point or more discrete points. The coordinate system of the image corresponds to mechanical coordinate system of the measuring machine 2 (shown on the FIG. 1). Therefore, the X-coordinate value and Y-coordinate value of the measurement point on the image are equal to X-coordinate value and Y-coordinate value of a solid point, which is on the under-measuring object 6 placed on the measuring machine 2 and corresponds to the measuring point on the image.

The controlling module 111 is mainly configured for controlling the laser aid 3 to search the solid points on the under-measured object 6 by moving the movable Z-axle of the measuring machine 2 according to the X-coordinate values and the Y-coordinate values of the measurement points, to emit laser lights to the solid points, and compute a vertical distance "h" between the laser aid 3 and each of the solid points according to the laser light reflected from each solid point.

The judging module 112 is mainly configured for determining whether each measurement point on the image is valid by judging whether the measurement point is within a predetermined image area. If the measurement point is within the predetermined image area, the judging module 112 ascertains that the measurement point is valid. Otherwise, if the measurement point is outside the predetermined image area, the judging module 112 ascertains that the measurement point is invalid.

The computing module 113 is mainly configured for computing Z-coordinate values of the measurement points according to the vertical distances "h" between the laser aid 3 and the solid points.

The outputting module 114 is mainly configured for outputting the X-coordinate values, the Y-coordinate values, and the Z-coordinate values of the measurement points on the display of the computer 1.

The focusing module 115 is mainly configured for controlling the lens 6 to focus the solid points one by one on the under-measured object 6 by moving the movable Z-axle of the measuring machine 2 according to the X-coordinate value, the Y-coordinate value, and the Z-coordinate value of each measurement point.

Figure 3:
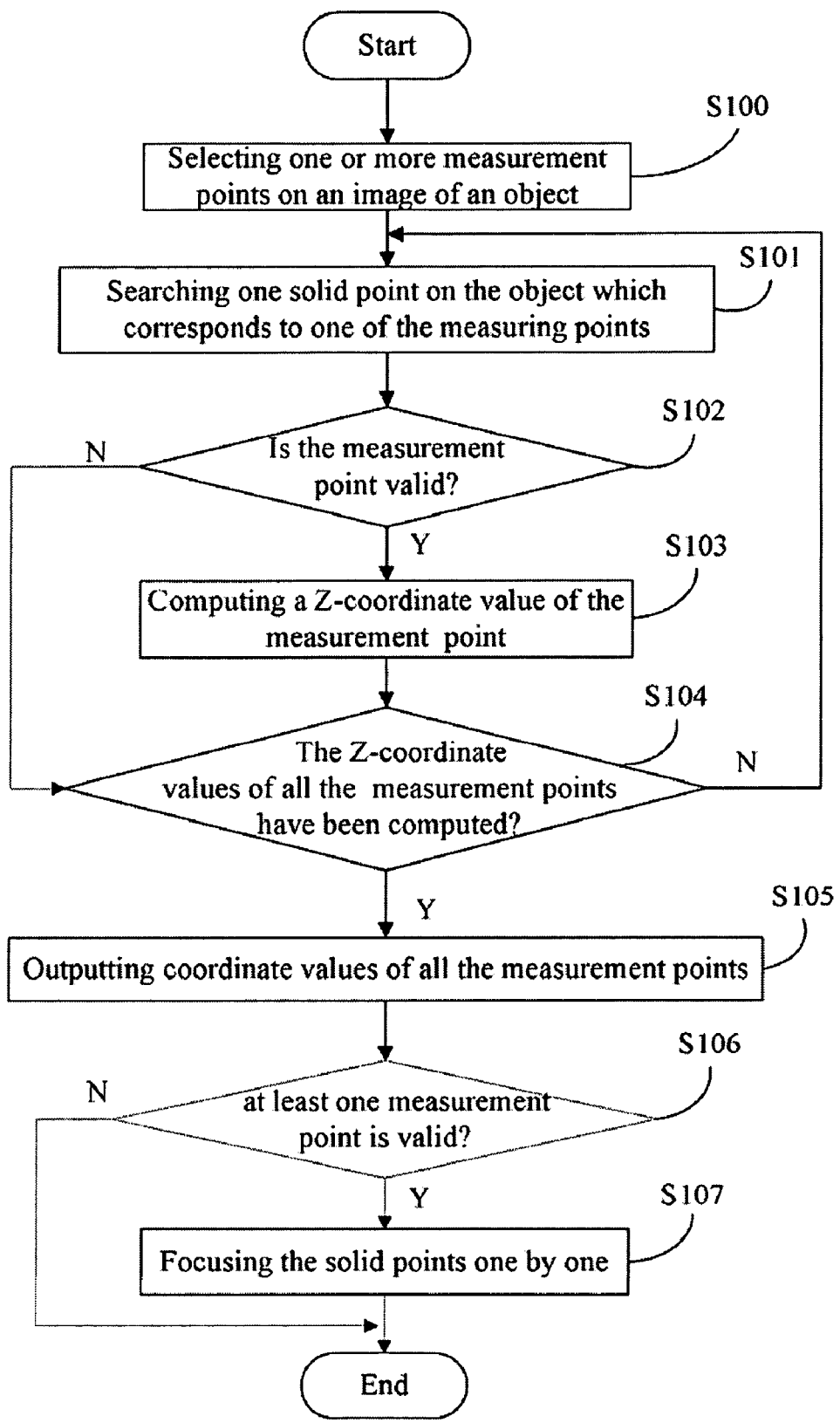
FIG. 3 is a flowchart illustrating a method for focusing discrete points on an object in accordance with a preferred embodiment.

FIG. 3 is a flowchart illustrating a method for focusing discrete points on an under-measured object in accordance with a preferred embodiment.

In step S100, the selecting module 110 receives the image of the under-measured object 6 acquired by the image acquiring card 10, selects measurement points on the image, and obtain X-coordinate values and Y-coordinate values of the measurement points. The measurement points may be a single point or more discrete points. The coordinate system of the image corresponds to mechanical coordinate system of the measuring machine 2 (shown on the FIG. 1). Therefore, the X-coordinate value and Y-coordinate value of the measurement point on the image are equal to X-coordinate value and Y-coordinate value of a solid point, which is on the under-measuring object 6 placed on the measuring machine 2 and corresponds to the measuring point on the image.

In step S101, the controlling module 111 controls the laser aid 3 to search a solid point on the under-measured object 6 by moving the movable Z-axle of the measuring machine 2 according to the X-coordinate value and the Y-coordinate value of one of the measurement points, to emit a laser light to the solid point, and to compute a vertical distance "h" between the laser aid 3 and the solid point according to the laser light reflected from the solid point, wherein the solid point corresponds to the measurement point.

In step S102, the judging module 112 determines that whether the measurement point selected on the image is valid by judging whether the measurement point is within a predetermined image area. If the measurement point is invalid, the procedure returns to step S104 as depicted below.

If the measurement point is valid, in step S103, the computing module 113 computes a Z-coordinate value of the measurement point according to the vertical distance "h" between the laser aid 3 and the solid point on the under-measured object 6.

In step S104, the judging module 112 determines whether the Z-coordinate values of all the measurement points have been computed. If no, the procedure returns to step S101, the controlling module 111 controls the laser aid 3 to search another solid point on the under-measured object 6 by moving the movable Z-axle of the measuring machine 2 according to the X-coordinate value and the Y-coordinate value of another measurement point.

If all measurement points have been computed, in step S105, the outputting module 114 outputs the X-coordinate values, the Y-coordinate values, and the Z-coordinate values of the measurement points on the display of the computer 1.

In step S106, the judging module 112 determines whether at least one measurement point is valid. If all measurement points are invalid, the procedure ends.

Otherwise, if at least one measurement point is valid, in step S107, the lens 5 focus the solid points one by one through the focusing module 115 to control the movable Z-axle of the measuring machine 2 to move according to the X-coordinate value, the Y-coordinate value, and the Z-coordinate value of each of the measurement points.

It is known that the image is planar, thus, the Z-coordinate value of the measurement point selected on the image is inexact. If the lens 5 focuses the solid point on the under-measuring object 6 directly, time is waste and the accuracy is very low. The present invention uses a laser 3 to search the solid point on the under-measuring object 6 according to the X-coordinate value and the Y-coordinate value of the corresponding measurement point, and computes the Z-coordinate value of the measurement point according to a vertical distance "h" between the laser 3 and the solid point. The lens 5 focuses the solid point on the under-measuring object 6 according to the X-coordinate value, the Y-coordinate value, and the Z-coordinate value, thus, time is saved and the accuracy is very high.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for focusing discrete points on an under-measured object, the system comprising a computer and a measuring machine, wherein:

the measuring machine is installed with a lens, a charge coupled device (CCD), and a laser aid, and the measuring machine is configured for obtaining an image of the under-measured object; and the computer comprises:

an image acquiring card connected to the CCD through a cable, and configured for acquiring the image of the under-measured object from the CCD; and a focusing program, which comprises:

a selecting module configured for selecting one or more measurement points on the image, and obtaining X-coordinate values and Y-coordinate values of the measurement points;

a controlling module configured for controlling the laser aid to search solid points on the under-measured object by moving the measuring machine according to the X-coordinate values and the Y-coordinate values of the measurement points, to emit laser lights to the solid points, and to compute a vertical distance "h" between the laser aid and each of the solid points according to the laser light reflected from each solid point, wherein each solid point on the under-measured object corresponds to a specific measurement point on the image;

a computing module configured for computing a Z-coordinate value of each of the measurement points according to the vertical distance "h"; and a focusing module configured for controlling the lens to focus the solid points one by one on the under-measured object by moving the measuring machine according to the X-coordinate value, the Y-coordinate value, and the Z-coordinate value of each measurement point.

2. The system as described in claim 1, wherein the measurement points are one or more discrete points.

3. The system as described in claim 1, wherein the computer further comprises:

a judging module configured for determining whether each of the measurements point is valid by judging whether the measurement point is within a predetermined image area.

4. The system as described in claim 1, wherein the computer further comprises:

an outputting module configured for outputting the X-coordinate values, the Y-coordinate values, and the Z-coordinate values of the measurement points on a display of the computer.

5. A computer-based method for focusing discrete points on an under-measured object, the method comprising steps of:

(a) receiving an image of the under-measured object from a measuring machine, selecting one or more measurement points on the image, and obtaining X-coordinate values and Y-coordinate values of the measurement points;

(b) controlling a laser aid installed on the measuring machine to search a solid point on the under-measured object by moving the measuring machine according to the X-coordinate value and the Y-coordinate value of one of the measurement points, wherein the solid point corresponds to the measuring point;

(c) controlling the laser aid to emit a laser light to the solid point, and to compute a vertical distance "h" between the laser aid and the solid point according to the laser light reflected from the solid point;

(d) computing a Z-coordinate value of the measurement point according to the vertical distance "h";

repeating step (b) to step (d) until all the Z-coordinate values of the measurement points have been computed; and (e) focusing the solid points one by one through a lens installed on the measuring machine by moving the measuring machine according to the X-coordinate value, the Y-coordinate value, and the Z-coordinate value of the measurement point.

6. The method as described in claim 5, further comprising a step of:

determining whether the measurement point is valid by judging whether the measurement point is within a predetermined image area.

7. The method as described in claim 5, further comprising a step of:

outputting the X-coordinate value, the Y-coordinate value, and the Z-coordinate value of the each measurement point on a display of a computer.

8. The method as described in claim 5, wherein the measurement points are one or more discrete points.

* * * * *